United States Patent
Liu et al.

(10) Patent No.: US 9,715,630 B2
(45) Date of Patent: Jul. 25, 2017

(54) MONITORING SYSTEM AND RELATED IMAGE SEARCHING METHOD

(71) Applicant: VIVOTEK INC., New Taipei (TW)

(72) Inventors: Chien-Wen Liu, New Taipei (TW);
Yi-Hsuen Shih, New Taipei (TW);
Guan-Zhong Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 197 days.

(21) Appl. No.: 14/644,209

(22) Filed: Mar. 11, 2015

(65) Prior Publication Data
US 2015/0269442 A1    Sep. 24, 2015

(30) Foreign Application Priority Data

Mar. 18, 2014 (TW) .............................. 103110170 A (51) Int. Cl.
| | |
|---|---|
| G06F 3/048 | (2013.01) |
| G06K 9/00 | (2006.01) |
| G06F 17/30 | (2006.01) |
| G11B 27/00 | (2006.01) |

(52) U.S. Cl.
CPC ... G06K 9/00771 (2013.01); G06F 17/30846 (2013.01); G11B 27/00 (2013.01); *G06K 2209/21* (2013.01)

(58) Field of Classification Search
CPC .... G11B 27/10; G11B 27/00; H04N 21/4307; H04N 21/44008; H04N 21/4662; G06F 17/30846; G06F 17/30849; G06F 17/30852; G06K 9/00771; G06K 2209/21

USPC .......................................................... 348/159
See application file for complete search history.

(56) References Cited

U.S. PATENT DOCUMENTS

| | | | | |
|---|---|---|---|---|
| 5,521,841 | A * | 5/1996 | Arman ................. | G06F 3/0485 |
| | | | | 345/589 |
| 8,228,372 | B2 * | 7/2012 | Griffin ................. | G11B 27/034 |
| | | | | 348/43 |
| 8,351,766 | B2 * | 1/2013 | Subbian .................. | H04N 7/18 |
| | | | | 386/326 |
| 9,141,860 | B2 * | 9/2015 | Vunic ................. | G06K 9/00711 |
| 9,270,928 | B2 * | 2/2016 | Lin .......................... | H04N 5/91 |
| 2002/0167540 | A1 * | 11/2002 | Dobbelaar ........ | G06F 17/30852 |
| | | | | 715/716 |
| 2002/0194610 | A1 * | 12/2002 | Lin ................... | G08B 13/19645 |
| | | | | 725/105 |
| 2006/0034856 | A1 * | 2/2006 | Kosmatopoulos ... | C07K 14/715 |
| | | | | 424/185.1 |

(Continued)

*Primary Examiner* — David Harvey
(74) *Attorney, Agent, or Firm* — Winston Hsu (57) ABSTRACT

A method of searching an image, which is disclosed in the present invention, includes selecting a first timing and a second timing to generate a first period, obtaining a plurality of first images from a first video streaming within the first period, and setting a second period according to at least one first image so as to obtain a plurality of second images from the first video streaming within the second period. The method of searching the image further includes simultaneously displaying a plurality of third image from a second video streaming within the second period, enlarging a selected image of the second images or the third images, and simultaneously enlarging another image that is captured at the same time as the time when the enlarging selected image is captured. The two enlarging images respectively belong to the first video streaming and the second video streaming.

13 Claims, 6 Drawing Sheets

(56) References Cited

U.S. PATENT DOCUMENTS

| | | | |
|---|---|---|---|
| 2007/0103558 A1* | 5/2007 | Cai | H04N 5/20 348/211.11 |
| 2007/0107029 A1* | 5/2007 | Monroe | H04N 7/181 725/105 |
| 2007/0168413 A1* | 7/2007 | Barletta | G06F 3/04883 709/203 |
| 2009/0002335 A1* | 1/2009 | Chaudhri | G06F 3/04815 345/173 |
| 2009/0063981 A1* | 3/2009 | Kikuchi | G11B 27/34 715/723 |
| 2009/0087161 A1* | 4/2009 | Roberts | G11B 27/031 386/282 |
| 2009/0089837 A1* | 4/2009 | Momosaki | G11B 27/034 725/40 |
| 2009/0154806 A1* | 6/2009 | Chang | G06F 17/30781 382/173 |
| 2009/0158326 A1* | 6/2009 | Hunt | G06F 3/04817 725/38 |
| 2010/0077289 A1* | 3/2010 | Das | G06F 17/30551 715/230 |
| 2010/0208082 A1* | 8/2010 | Buchner | H04H 20/18 348/207.1 |
| 2011/0122315 A1* | 5/2011 | Schweiger | H04N 21/2365 348/500 |
| 2011/0317982 A1* | 12/2011 | Xu | G06F 17/30843 386/241 |
| 2012/0166950 A1* | 6/2012 | Frumar | G06F 3/04883 715/719 |
| 2013/0097507 A1* | 4/2013 | Prewett | G08B 13/19602 715/720 |
| 2013/0145268 A1* | 6/2013 | Kukulski | G11B 27/034 715/719 |
| 2013/0290557 A1* | 10/2013 | Baratz | H04L 65/60 709/231 |
| 2013/0300933 A1* | 11/2013 | Thorson | H04N 21/4307 348/500 |
| 2014/0126881 A1* | 5/2014 | Yoneda | H04N 21/2743 386/241 |
| 2014/0186004 A1* | 7/2014 | Hamer | H04N 21/21805 386/223 |
| 2014/0324864 A1* | 10/2014 | Choe | G06F 17/30823 707/737 |
| 2015/0015680 A1* | 1/2015 | Wang | H04N 13/04 348/51 |
| 2016/0180883 A1* | 6/2016 | Hamer | G11B 27/034 386/201 |

* cited by examiner

MONITORING SYSTEM AND RELATED IMAGE SEARCHING METHOD

BACKGROUND OF THE INVENTION

1. Field of the Invention

The present invention relates to a monitoring system and a related image searching method, and more particularly, to a monitoring system and a related image searching method with hierarchical comparing technology.

2. Description of the Prior Art

A conventional recording playback system takes a large quantity of labor power and labor hour to execute uninterrupted observation for searching required information from the video tape. An observer must concentrate on the video streaming of the recording playback system dozens of hours while only knowing an event happened someday, to avoid missing clues. Even though a happened timing of the event is recognized from the first camera over a long period, the video tape of the second camera, which has field of view different from ones of the first camera, has to play from start to final to obtain the images captured at the same time by different cameras. Therefore, operation of the conventional recording playback system is inconvenient, and the observer cannot quickly recognize the images at required timing. As the conventional recording playback system includes several cameras, displaying the video tapes of the cameras one-by-one to search the required images is a troublesome and difficult task.

SUMMARY OF THE INVENTION

The present invention provides a monitoring system and a related image searching method with hierarchical comparing technology for solving above drawbacks.

According to the claimed invention, an image searching method applied to a monitoring system having a first video streaming and a second video streaming is disclosed. The image searching method includes selecting a first timing and a second timing to generate a first period, obtaining a plurality of first images from the first video streaming within the first period, setting a second period according to at least one of the plurality of first images so as to obtain a plurality of second images from the first video streaming within the second period, displaying a plurality of third images from the second video streaming within the second period simultaneously, enlarging a selected image from the plurality of second images or from the plurality of third images, and enlarging another image captured at a time equivalent to timing of the enlarged selected image, wherein the two foresaid enlarged images respectively belong to the first video streaming and the second video streaming.

According to the claimed invention, a monitoring system includes a first camera, a second camera, an input interface, a display unit and a controller. The first camera is adapted to obtain a first video streaming. The second camera is adapted to obtain a second video streaming, and field of view of the second video streaming is different from field of view of the first video streaming. The controller is electrically connected to the first camera, the second camera, the input interface and the display unit. The controller is adapted to read a first timing and a second timing to generate a first period and then to drive the display unit to obtain a plurality of first images from the first video streaming within the first period. The controller is further adapted to set a second period according to at least one of the plurality of first images, to obtain a plurality of second images from the first video streaming within the second period and to drive the display unit to simultaneously display a plurality of third images from the second video streaming within the second period. The controller is further adapted to read a selected position of the input interface, to enlarge a selected image from the plurality of second images or from the plurality of third images and to simultaneously enlarge another image captured at a time equivalent to timing of the enlarged selected image. The two foresaid enlarged images respectively belong to the first video streaming and the second video streaming.

The monitoring system and the related image searching method of the present invention utilize the hierarchical comparing technology to rapidly recognize the image captured at the specific timing from the video streaming, and simultaneously display whole images captured at the same timing by all cameras of the monitoring system. Comparing to the prior art, the present invention does not repeatedly reset the specific timing to search the images captured at the same time through the whole cameras, so as to economize operating and setting time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
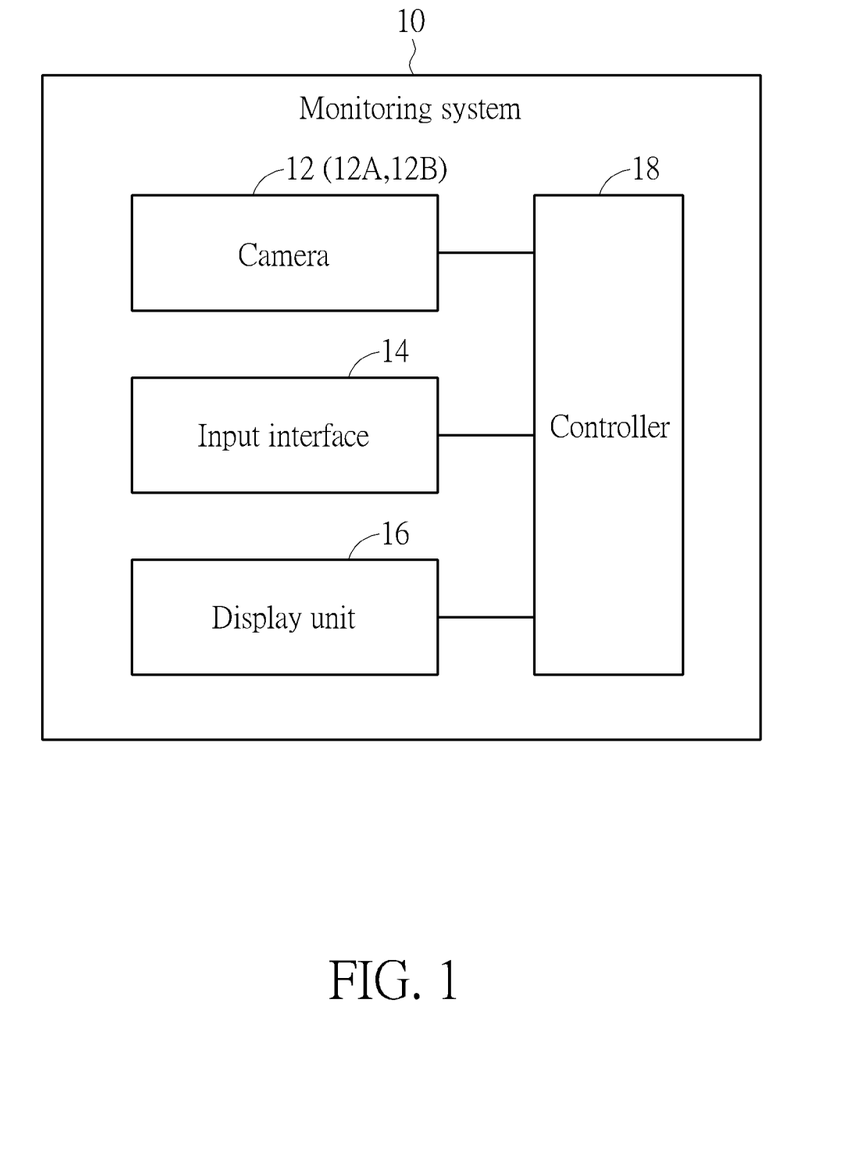
FIG. 1 is a functional block diagram of a monitoring system according to an embodiment of the present invention.

Please refer to FIG. 1. FIG. 1 is a functional block diagram of a monitoring system 10 according to an embodiment of the present invention. The monitoring system 10 includes a plurality of cameras 12, an input interface 14, a display unit 16 and a controller 18. Disposition of the cameras 12 are different from each other. For example, this embodiment includes the first camera 12A and the second camera 12B, field of view of the first camera 12A may be different from field of view of the second camera 12B, or the first camera 12A and the second camera 12B owns the lens respectively with different scaling (zoom in/out) ratios. It is to say, the first camera 12A and the second camera 12B are utilized to obtain a first video streaming and a second video streaming with different field of views respectively. The input interface 14 can be a keyboard, a mouse, a touch panel or any operating interface that can be used to input a control command. The display unit 16 can be a normal liquid crystal display or any displaying product that can show an image, such as the projector.

The controller 18 is electrically connected to the plurality of cameras 12, the input interface 14 and the display unit 16. The controller 18 can read application programs stored in a built-in memory or an external hard disk, and execute an image searching method suitable for the monitoring system 10 according to the application programs. The controller 18 utilizes a hierarchical comparing technology to recognize an image captured at a specific timing from the video streaming of one of the plurality of cameras 12 (such as from the first video streaming of the first camera 12A), and drives the display unit 16 to simultaneously display another image captured at timing equivalent to the specific timing by the other camera 12 (such as from the second video streaming of the second camera 12B). The monitoring system 10 can conveniently compare difference of the foresaid images from different video streaming, to determine whether any object in an area monitored by the monitoring system 10 is stolen, or to monitor the images captured at the same timing by different cameras.

Figure 2:
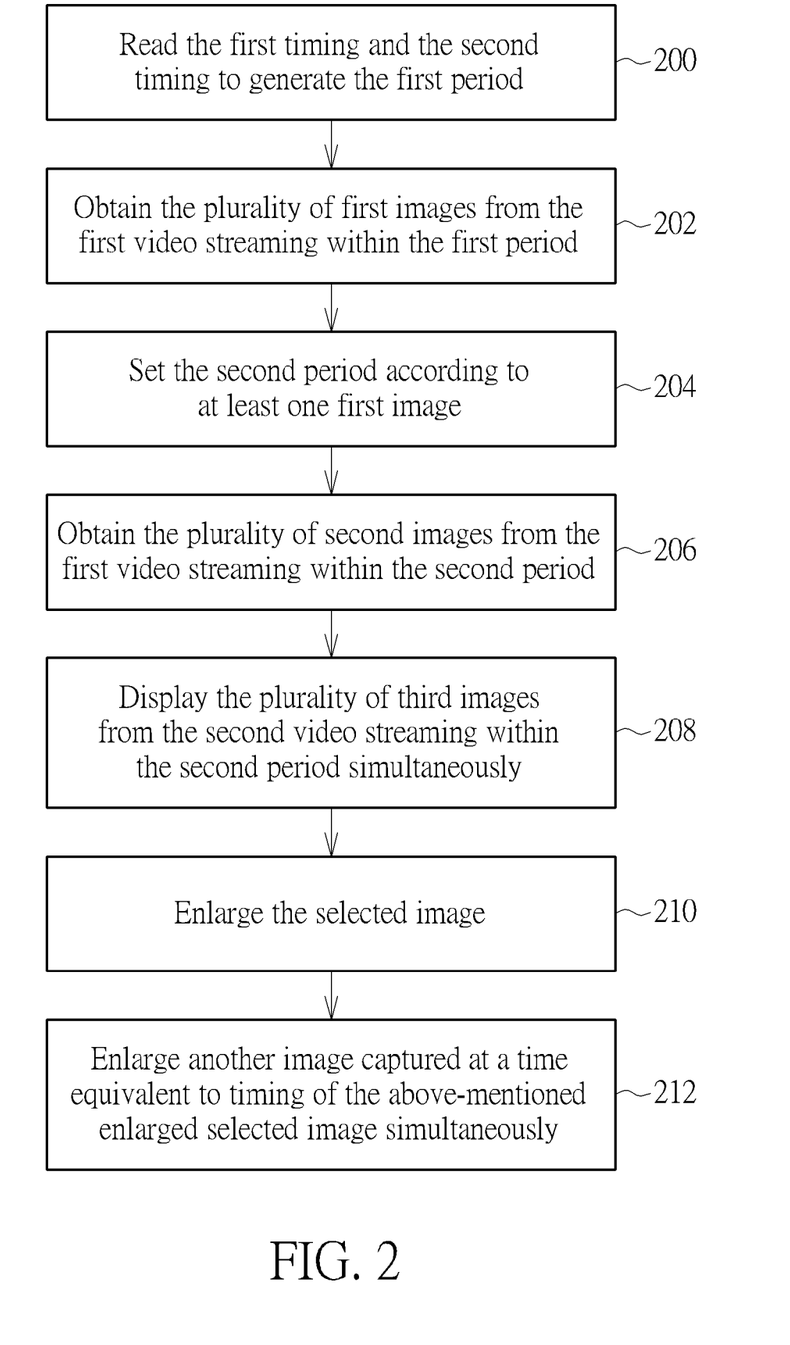
FIG. 2 is a flow chart of the image searching method according to the embodiment of the present invention.
Figure 3:
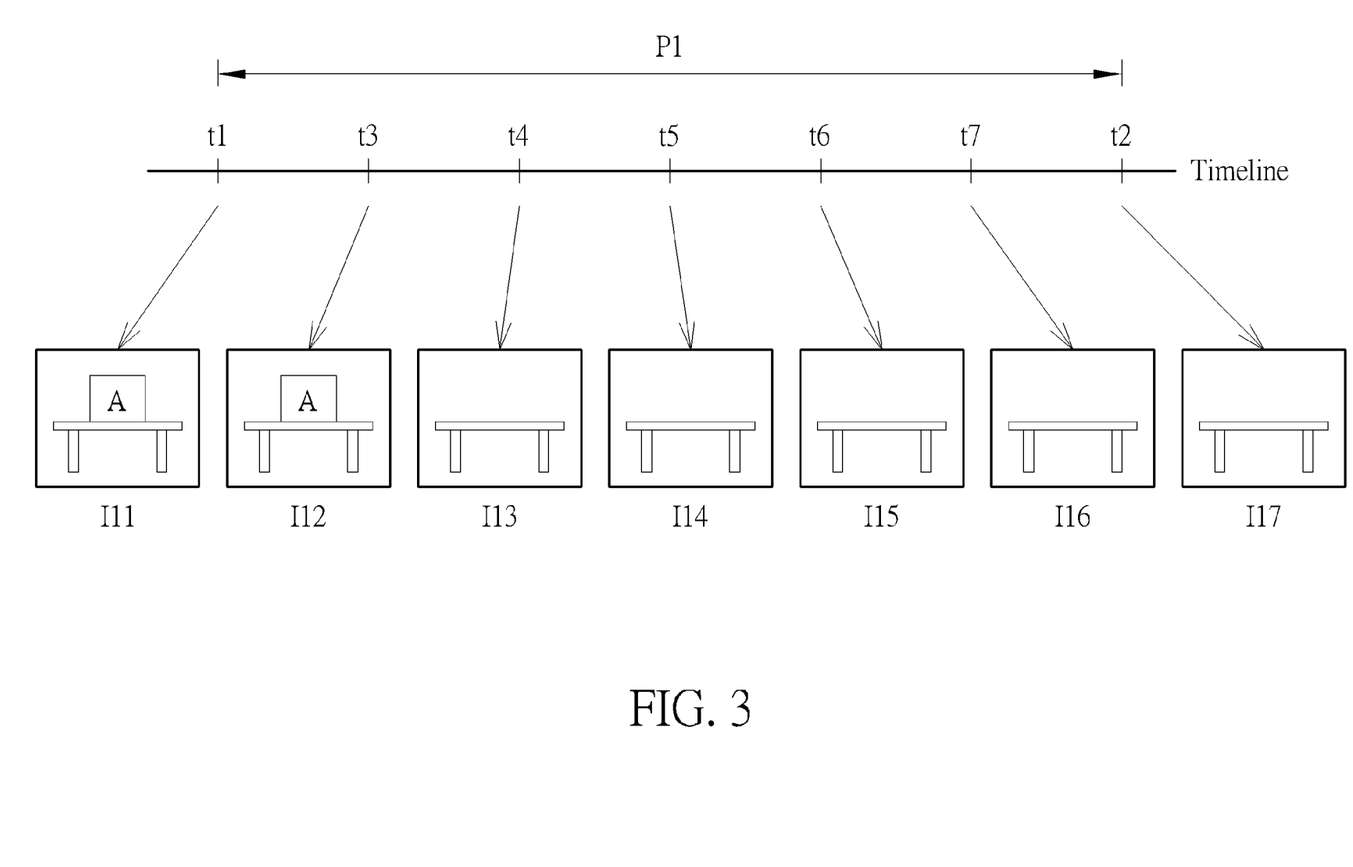
FIG. 3 and FIG. 4 respectively are diagrams illustrating the image searching method shown in FIG. 2.
Figure 4:
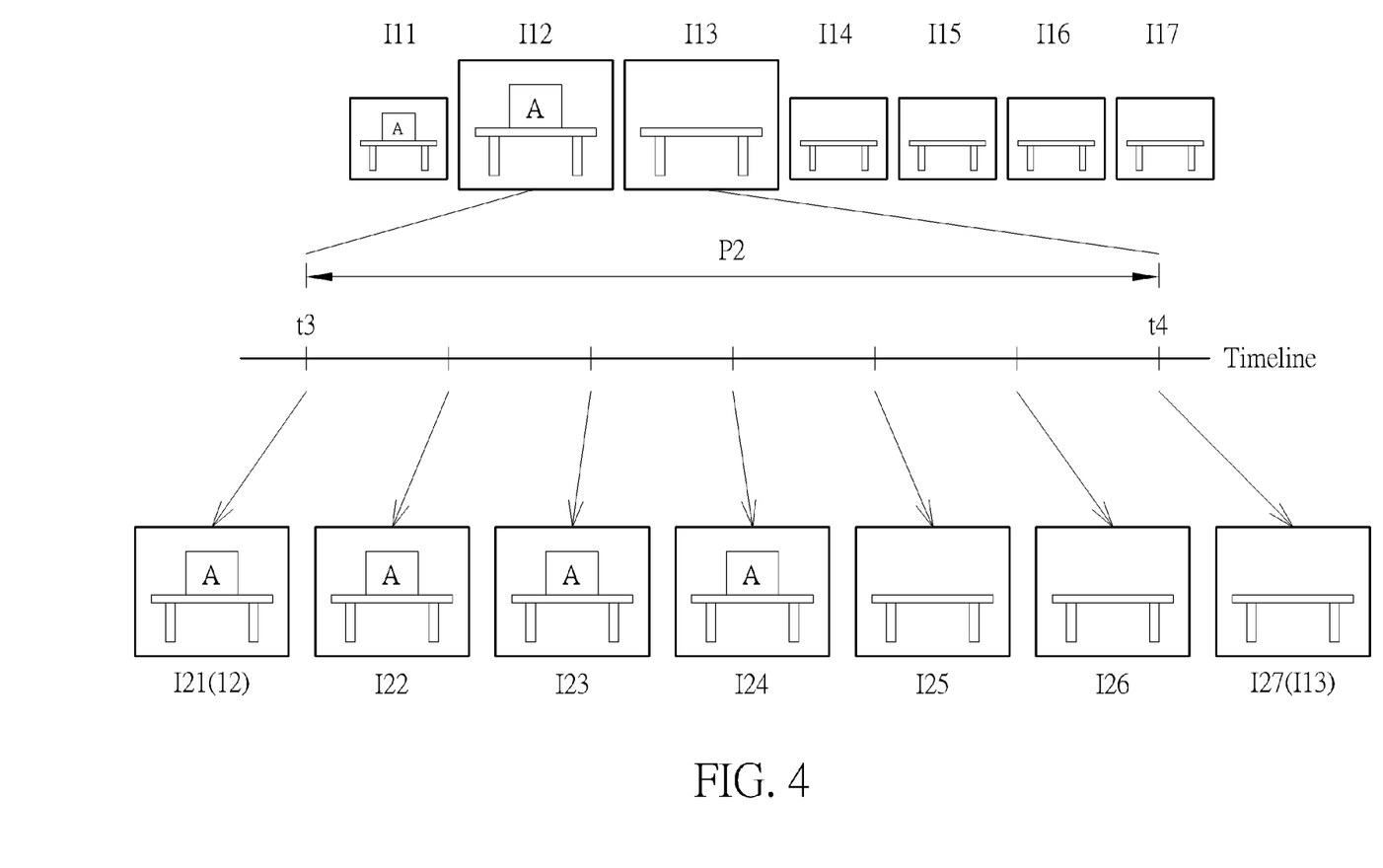

Please refer to FIG. 2 to FIG. 4. FIG. 2 is a flow chart of the image searching method according to the embodiment of the present invention. FIG. 3 and FIG. 4 respectively are diagrams illustrating the image searching method shown in FIG. 2. The image searching method shown in FIG. 2 is suitable for the monitoring system 10 shown in FIG. 1. In this embodiment, the first camera 12A is the primary searching camera, the second camera 12B is the auxiliary searching camera which can be plural and has the field of view different from ones of the first camera 12A, and application of the cameras 12A, 12B is not limited to the above description. First, steps 200 and 202 are executed, the controller 18 reads a first timing t1 and a second timing t2 to generate a first period P1, captures a plurality of first images I11~I1N (N can be any numeral) from the first video streaming within the first period P1, and then drives the display unit 16 to display the plurality of first images I11~I1N. The captured image can be a contracted graph of the first video streaming.

In different applications, the image searching method can use predetermined function such as average distribution, arithmetical distribution or geometrical distribution to obtain the plurality of images within the period, and the embodiment of the present invention obtains seven images by the average distributing function. Above all, times 00:00 and 24:00 can be initially set as the first timing t1 and the second timing t2 respectively, so the first period P1 equals 24 hours. For capturing seven first images I11~I17 (in this embodiment, N=7.), the first period P1 are averagely distributed into a plurality of timings t1~t7, and the first images I11~I17 can be accordingly captured at the timings t1~t7, such as the first image I11 (t1=00:00), the first image I12 (t3=04:00), the first image I13 (t4=08:00), the first image I14 (t5=12:00), the first image I15 (t6=16:00), the first image I16 (t7=20:00) and the first image I17 (t2=24:00), which are shown in FIG. 3.

An amount of the first image captured within the first period P1 is not limited to the above-mentioned embodiment, time difference of the average distribution and timing of the captured image are not limited to the above-mentioned embodiment, which depend on design demand. Furthermore, arithmetical index or geometrical index of the captured timing of the image obtained within the regular period by the arithmetical distribution or the geometrical distribution can be designed according to actual demand, and a detailed description is omitted herein for simplicity.

Then, steps 204 and 206 are executed, the controller 18 sets the second period P2 according to timing of at least one first image from the plurality of first images I11~I1N, and obtains a plurality of second images I21~I2N (N can be any numeral) from the first video streaming within the second period P2. The second period P2 can be set by timings of two adjacent first images from the plurality of first images I11~I1N. As shown in FIG. 3 and FIG. 4, an object A can be observed in the first image I12 but not seen in the first image I13, so the user can use the input interface 14 to select the first image I12, and the image searching method automatically chooses the adjacent image (which means the first image I13) next to the select image (which represents the first image I12) and sets the second period P2 according to the timings t3, t4 of the first images I12, I13.

As the second images I21~I27 are obtained within the second period P2 by the average distribution, a time interval of the second period P2 can be divided into seven timings, and the second images I21~I27 are obtained at the corresponding timings, such as the second image I21 (t3=04:00), the second image I22 (t=04:40), the second image I23 (t=05:20), the second image I24 (t=06:00), the second image I25 (t=06:40), the second image I26 (t=07:20) and the second image I27 (t4=08:00). The second images further can be obtained within the second period P2 by the arithmetical distribution or the geometrical distribution, and a related description is mentioned as above and omitted herein for simplicity.

Further, the second period P2 can be a predetermined time interval set by the user, such as four hours. For example, the controller 18 may set the second period P2 between the capturing time of one of the plurality of first images I11~I1N and another timing with four hours later than the foresaid capturing time, which means the second period P2 can be set from the timing t3 of the first image I12 to another timing of four hours later than the timing t3. While the plurality of second images I21~I2N is obtained within the second period P2, one of the plurality of second images I21~I2N, such as the second image I21, can be selected to set a third period between timing of the second image I21 and another timing with a predetermined interval (probably an hour) from the foresaid timing, and a plurality of images can be further obtained within the third period. That is, the present invention can gradually vary time interval of the period such like being varied as twenty-four hours, four hours, an hour, ten minutes and two minutes, so as to obtain the image from the video streaming within a fourth period or a five period or more.

Timing difference of the adjacent captured images within each of the above-mentioned periods is defined by a predetermined time interval, making length of each period to be an integral multiple of an amount of the captured image. However, the actual application may optionally choose the first embodiment mentioned above to catch timings of two adjacent images for period setting, or the second embodiment mentioned above to catch an image and set the period by the predetermined time interval apart from timing of the captured image, so as to execute image comparison for preferred system efficiency.

Figure 5:
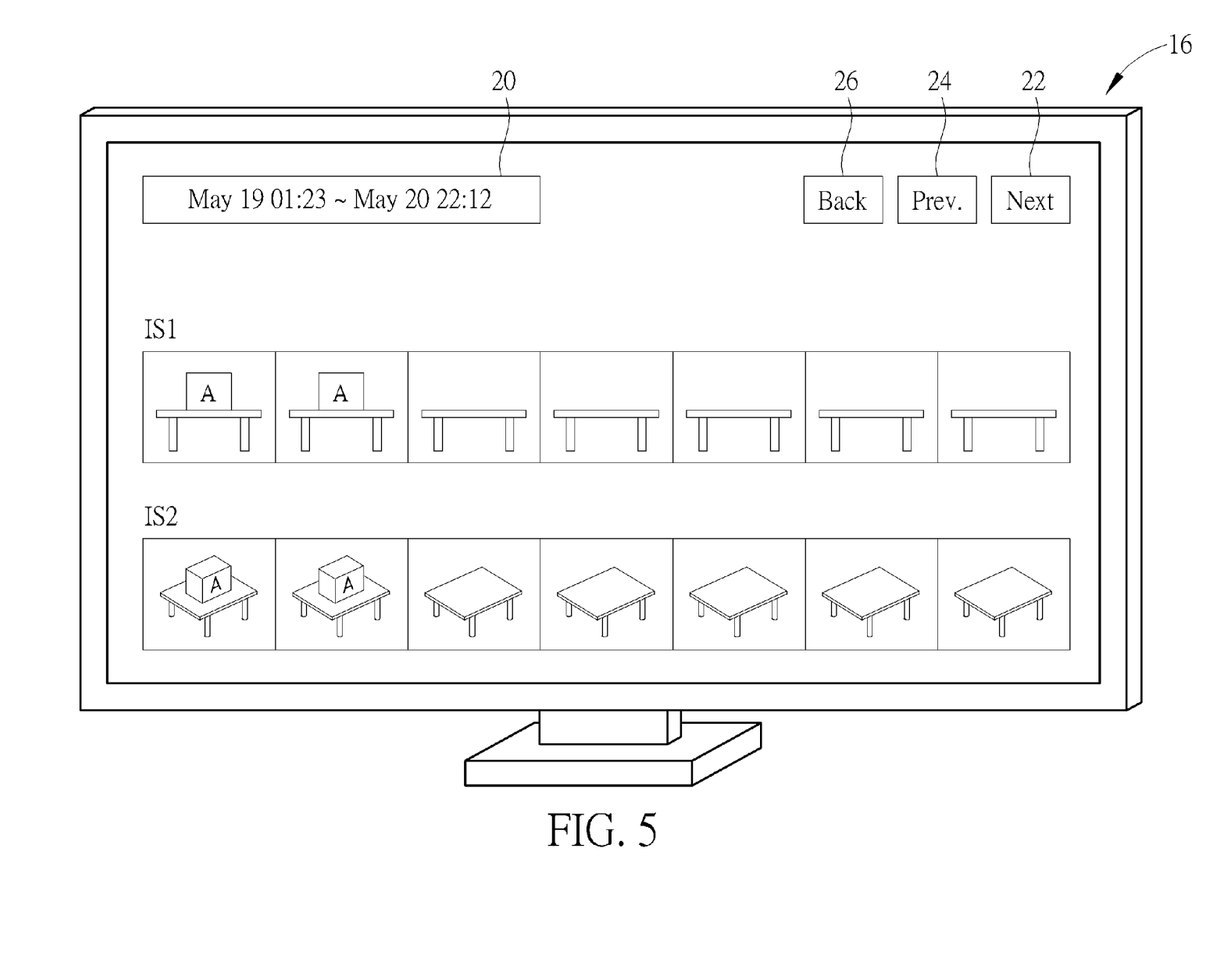
FIG. 5 and FIG. 6 respectively are diagrams of simultaneously displaying the captured images from different video streaming according to the embodiment of the present invention.
Figure 6:
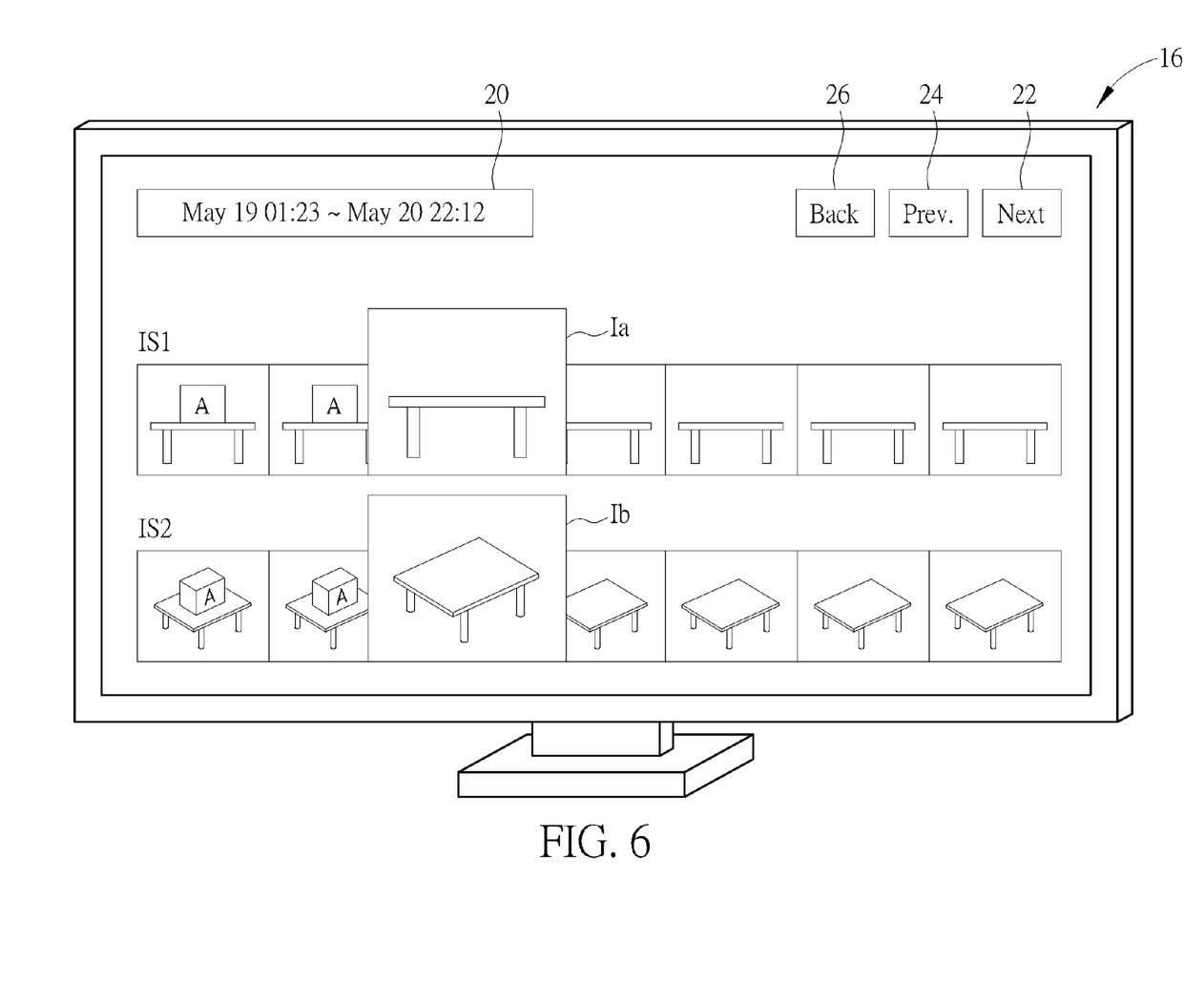

Then, step 208 is executed that the controller 18 drives the display unit 16 to simultaneously display the plurality of third images from the second video streaming within the second period P2 after the plurality of second images I21~I2N is obtained, and an amount and capturing time of the third image are the same as the amount and the capturing time of the second image. Please refer to FIG. 5 and FIG. 6. FIG. 5 and FIG. 6 respectively are diagrams of simultaneously displaying the captured images from different video streaming according to the embodiment of the present invention. The first images of the first video streaming IS1 are displayed on the display unit 16 after setting the first period P1; meanwhile, the third images of the second video streaming IS2 can be automatically displayed or be displayed while the controller 18 reads a command from the input interface 14. The capturing time of each first image of the first video streaming IS1 is equivalent to the capturing time of corresponding third image of the second video streaming IS2.

As setting the second period P2, the second images of the first video streaming IS1 are displayed on the display unit 16, the corresponding third images of the second video streaming IS2 can be displayed on the display unit 16 automatically or driven by the command from the input interface 14. Therefore, no matter where the selected timing is located within the first period, the second period or the third period, the image searching method of the present invention can drive the display unit 16 to simultaneously display the images from the first video streaming IS1 and from the second video streaming IS2 that are captured at the same timing (for example, the first image and the third image, or the second image and the third image are simultaneously displayed), and the user can observe the area monitored by the monitoring system 10 in various field of views.

Final, steps 210 and 212 are executed to enlarge the selected image and further to simultaneously enlarge another image captured at a time equivalent to timing of the foresaid enlarged selected image. As shown in FIG. 6, the image Ia (which can be the first image or the second image) is selected from the first video streaming IS1 by the input interface 14. The image searching method enlarges the selected image Ia, and recognizes another image Ib captured at the time equivalent to timing of the enlarged selected image Ia from the second video streaming IS2, so the image Ia and the image Ib are simultaneously enlarged and displayed on the display unit 16. The image Ia and the image Ib respectively belongs to the first video streaming IS1 (one of the first image or the second image) and the second video streaming IS2 (the third image). Dimension of the enlarged image can be an initial size of the original video streaming, or can be contracted/magnified relative to the initial size by a predetermined ratio.

In order to distinguish whether the object A exists through the video streaming, the present invention can display the video streaming IS1, IS2 starting from the enlarged image Ia, Ib accordingly. First, the enlarged image Ia, Ib is selected by the input interface 14, the controller 18 reads the capturing time of the selected enlarged image, and displays the video streaming (such as the first video streaming IS1 or the second video streaming IS2) which belongs to the selected enlarged image according to the capturing time. Besides, the image searching method may display the video streaming belonging to the enlarged image at a present timing about the capturing time, or display the video streaming belonging to the enlarged image at timing with a predetermined interval from the capturing time such as five seconds earlier than the capturing time.

It should be mentioned that the monitoring system 10 may be applied to an area on daylight saving time, and the image searching method of the present invention can determine whether a recording time of the video streaming (which means the capturing time of the selected enlarged image) conforms to the daylight saving time according to predetermined information (which represents the command stored in the built-in memory or the external hard disk). As the recording time of the video streaming does not conform to the daylight saving time, such as the daylight saving time of the monitoring system 10 not activated, the image searching method enlarges and displays the selected image. As the recording time of the video streaming conforms to the daylight saving time, the controller 18 can find out the timing adjusted by the daylight saving time and drives the display unit 16 to display the captured images reduplicated due to the daylight saving time for convenient comparison.

As shown in FIG. 5 and FIG. 6, the monitoring system 10 has a time adjusting button 20 located on a left corner of the control interface and further has a next button 22 and a previous button 24 located on a right corner of the control interface. The time adjusting button 20 is utilized to set the first timing and the second timing. The next button 22 and the previous button 24 are utilized to adjust timing of the contracted images of the video streaming. While the user selects an image from the first video streaming IS1 or the second video streaming IS2, the image searching method of the present invention can automatically display the images captured within the second period; while the user actuates a back button 26 located on the right corner of the control interface via the input interface 14, the image searching method displays the image of the video streaming captured within the first period, instead of ones within the second period.

In conclusion, the monitoring system and the related image searching method of the present invention utilize the hierarchical comparing technology to rapidly recognize the image captured at the specific timing from the video streaming, and simultaneously display whole images captured at the same timing by all cameras of the monitoring system. Comparing to the prior art, the present invention does not repeatedly reset the specific timing to search the images captured at the same time through the whole cameras, so as to economize operating and setting time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image searching method applied to a monitoring system having a first video streaming and a second video streaming, the image searching method comprising:
    selecting a first timing and a second timing to generate a first period;
    obtaining a plurality of first images from the first video streaming within the first period, wherein the plurality of first images is not continuous images;
    setting a second period according to a time interval between two adjacent first images of the plurality of first images so as to obtain a plurality of second images from the first video streaming within the second period;
    displaying a plurality of third images from the second video streaming within the second period simultaneously;
    enlarging a selected image from the plurality of second images or from the plurality of third images; and
    enlarging another image captured at a time equivalent to timing of the enlarged selected image, wherein the two foresaid enlarged images respectively belong to the first video streaming and the second video streaming.

2. The image searching method of claim 1, further comprising:
    obtaining the plurality of first images within the first period by a predetermined function.

3. The image searching method of claim 2, wherein the predetermined function averagely distributes the first period into a plurality of timings, and respectively obtains the plurality of first images according to the plurality of timings.

4. The image searching method of claim 1, further comprising:

reading a capturing time of one of the two enlarged images; and displaying the video streaming belonging to the read enlarged image according to the capturing time.

5. The image searching method of claim 4, wherein a step of displaying the video streaming belonging to the read enlarged image according to the capturing time comprises:

displaying the corresponding video streaming at a present timing about the capturing time or at another timing with a predetermined interval from the capturing time.

6. The image searching method of claim 1, further comprising:

determining whether the capturing time of the enlarged image conforms to daylight saving time; and displaying an image adjusted by the daylight saving time while the capturing time conforms to the daylight saving time.

7. A monitoring system comprising:

a first camera adapted to obtain a first video streaming;

a second camera adapted to obtain a second video streaming, field of view of the second video streaming being different from field of view of the first video streaming;

an input interface;

a display unit; and a controller electrically connected to the first camera, the second camera, the input interface and the display unit, the controller being adapted to read a first timing and a second timing to generate a first period and then to drive the display unit to obtain a plurality of first images from the first video streaming within the first period, the controller being further adapted to set a second period according to a time interval between two adjacent first images of the plurality of first images, to obtain a plurality of second images from the first video streaming within the second period and to drive the display unit to simultaneously display a plurality of third images from the second video streaming within the second period, the controller being further adapted to read a selected position of the input interface, to enlarge a selected image from the plurality of second images or from the plurality of third images and to simultaneously enlarge another image captured at a time equivalent to timing of the enlarged selected image, wherein the two foresaid enlarged images respectively belong to the first video streaming and the second video streaming and the plurality of first images is not continuous images.

8. The monitoring system of claim 7, wherein the controller drives the display unit to display images of the first video streaming, and then drives the display unit to display images of the second video streaming after reading a command from the input interface.

9. The monitoring system of claim 7, wherein the controller further obtains the plurality of first images within the first period by a predetermined function according to a command from the input interface.

10. The monitoring system of claim 9, wherein the predetermined function averagely distributes the first period into a plurality of timings, and respectively obtains the plurality of first images according to the plurality of timings.

11. The monitoring system of claim 7, wherein the controller reads a capturing time of one of the two enlarged images, and drives the display unit to display the video streaming belonging to the read enlarged image according to the capturing time.

12. The monitoring system of claim 11, wherein a step of displaying the video streaming belonging to the read enlarged image according to the capturing time comprises displaying the corresponding video streaming at a present timing about the capturing time or at another timing with a predetermined interval from the capturing time.

13. The monitoring system of claim 7, wherein the controller determines whether the capturing time of the enlarged image conforms to daylight saving time, and drives the display unit to display an image adjusted by the daylight saving time while the capturing time conforms to the daylight saving time.

* * * * *